(12) United States Patent
Torrero

(10) Patent No.: US 10,882,704 B2
(45) Date of Patent: Jan. 5, 2021

(54) CAM DEVICE FOR A PICK-UP HEAD PROVIDED WITH PICK-UP MEMBERS ARRANGED SIDE BY SIDE AND AT A VARIABLE DISTANCE, AND PICK-UP HEAD PROVIDED WITH SUCH CAM DEVICE

(71) Applicant: Carle & Montanari—OPM S.P.A., Bologna (IT)

(72) Inventor: Tonino Torrero, Bologna (IT)

(73) Assignee: Carle & Montanari—OPM S.P.A., Imola (IT)

(*) Notice: Subject to any disclaimer, the term of this patent is extended or adjusted under 35 U.S.C. 154(b) by 85 days.

(21) Appl. No.: 16/381,283

(22) Filed: Apr. 11, 2019

(65) Prior Publication Data

US 2019/0315576 A1    Oct. 17, 2019

(30) Foreign Application Priority Data

Apr. 13, 2018   (IT) .................. 102018000004497

(51) Int. Cl.
  *B65G 47/90* (2006.01)
  *B25J 15/06* (2006.01)
  *B25J 15/00* (2006.01)

(52) U.S. Cl.
  CPC ........ *B65G 47/907* (2013.01); *B25J 15/0052* (2013.01); *B25J 15/0616* (2013.01)

(58) Field of Classification Search
  CPC ..... H01L 21/68; B65G 47/918; B65G 47/907; H05K 13/0411; H05K 13/0413; B25J 15/0052; B25J 15/0057; B25J 15/0616
  See application file for complete search history.

(56) References Cited

U.S. PATENT DOCUMENTS

| 6,068,317 A * | 5/2000 | Park ........................ H01L 21/68 294/87.1 |
| 2019/0202645 A1* | 7/2019 | Slurink ................ B65G 47/915 |

FOREIGN PATENT DOCUMENTS

| EP | 2192062 A1 * | 6/2010 | ........... B65G 47/918 |
| EP | 2192063 A1 * | 6/2010 | .......... B25J 15/0061 |

* cited by examiner

*Primary Examiner* — Gerald McClain
(74) *Attorney, Agent, or Firm* — McCarter & English, LLP

(57) ABSTRACT

A rotating cam device for a pick-up head with pick-up members arranged side by side and at a variable distance. The device extends along a horizontal axis an has a first cam and at least a second cam, which extend around the horizontal axis, are suitable to be engaged by tappet elements carried by a first and a second pick-up member, respectively, and at least partly have a sloped or spiral shape for causing a translation of the tappet elements parallel to the horizontal axis in response to a rotation of the first and second cams about the horizontal axis; the second cam is movable in respect to the first cam along the horizontal axis, at least when the device is installed in the pick-up head and rotates around the horizontal axis.

9 Claims, 6 Drawing Sheets

CAM DEVICE FOR A PICK-UP HEAD PROVIDED WITH PICK-UP MEMBERS ARRANGED SIDE BY SIDE AND AT A VARIABLE DISTANCE, AND PICK-UP HEAD PROVIDED WITH SUCH CAM DEVICE

CROSS-REFERENCE TO RELATED APPLICATIONS

This Patent application claims priority from Italian Patent Application No. 102018000004497 filed on Apr. 13, 2018, the entire disclosure of which is incorporated herein by reference.

TECHNICAL FIELD

The invention relates to a cam device for a pick-up head provided with pick-up members arranged side by side and at a variable distance.

BACKGROUND ART

In order to transfer products from a pick-up station to a storing station, transfer machines are known, which comprise a robot and a pick-up head, which is moved by the robot between the two stations and comprises a series of pick-up members arranged side by side and operated so as to grip, hold and release respective products. In the pick-up station, the products are arranged in a row at a predetermined constant distance, whereas the storing station usually has one or more containers where the products are packaged at a distance different from the one of the pick up station.

The pick-up head comprises a horizontal guide, to which the pick-up members are coupled in a sliding manner. The distance between the pick-up members along the horizontal guide is reduced during the transfer from the pick-up station to the storing station, so as to place the products at the distance requested by the storing station.

In order to move the pick-up members close to, or away from, one another along the horizontal guide, solutions are known, which comprise a translating plate or a rotating cylinder, which have a aeries of cams or tracks on an outer side surface thereof. In both cases, the cams or tracks are engaged by respective tappet elements, which, in turn, are carried by the pick-up members. The cylinder or the plate is operated so as to cause the tappet elements to slide along the cams and, as a consequence, have the pick-up members rotate at predetermined speeds and towards predetermined positions.

A solution with a rotating cylinder is disclosed, for example, in patent EP2192063, wherein the cams are continuous in a circumferential direction around said cylinder.

There is a need to improve the known solutions of the type described above so as to increase the travel covered by the pick-up members alone the horizontal guide due to the rotation of the cylinder.

DISCLOSURE OF INVENTION

The object of the invention is to provide a cam device for a pick-up head provided with pick-up members arranged side by side and at a variable distance, which can fulfil the aforesaid need in a simple and economic fashion, preferably by means of a relatively small number of pieces and/or so that it can be replaced in a relatively simple and safe manner.

According to the invention, there is provided a rotating cam device for a pick-up head provided with pick-up members arranged side by side and at a variable distance, according to claim 1.

BRIEF DESCRIPTION OF THE DRAWINGS

The invention will now be described with reference to the accompanying drawings, which show a non-limiting embodiment thereof, wherein:

FIG. 8 shows a different rotating cam device, which is interchangeable with the device of FIG. 5.

BEST MODE FOR CARRYING CUT THE INVENTION

Figure 1:
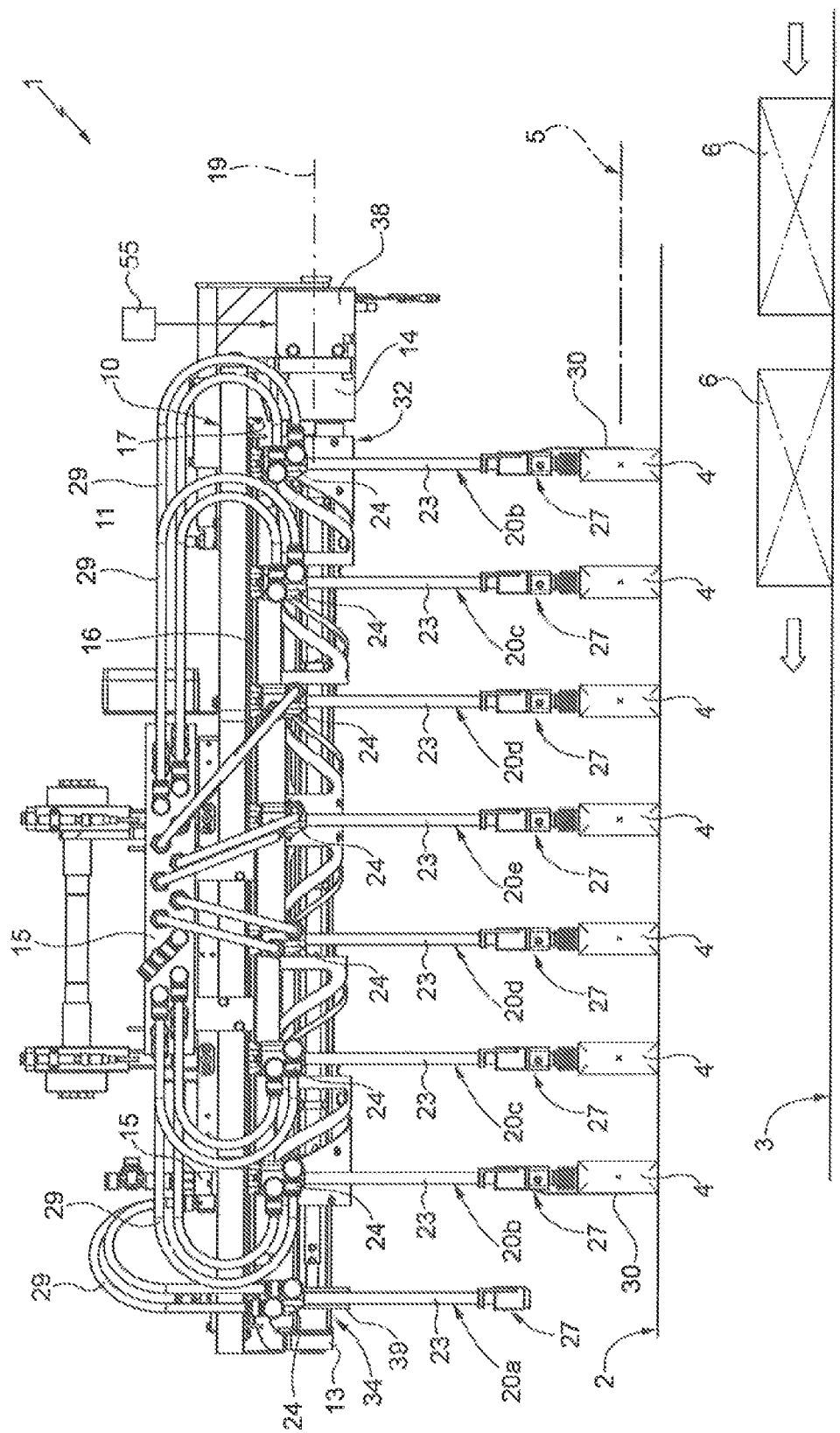
FIG. 1 is a front view, with schematic parts, of a preferred embodiment of the rotating cam device for a pick-up head provided with pick-up members arranged side by side and at a variable distance, according to the invention, while it picks up some products.

In FIG. 1, number 1 indicates a pick-up head, which is moved by a robot, which is not shown herein, in order to transfer products 4 from a pick-up station 2 to a storing station 3 (which are schematically shown).

Figure 2:
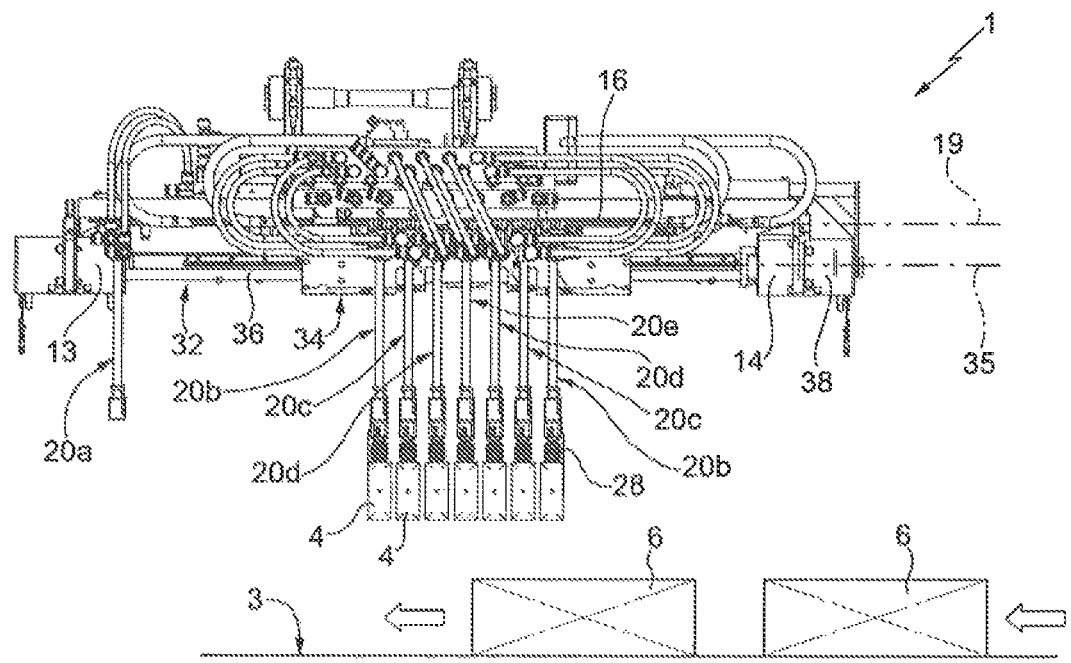
FIGS. 2 and 3 are similar to FIG. 1 and show the pick-up head in a different operating condition for the transfer and the packaging of the products that were previously picked up.
Figure 3:
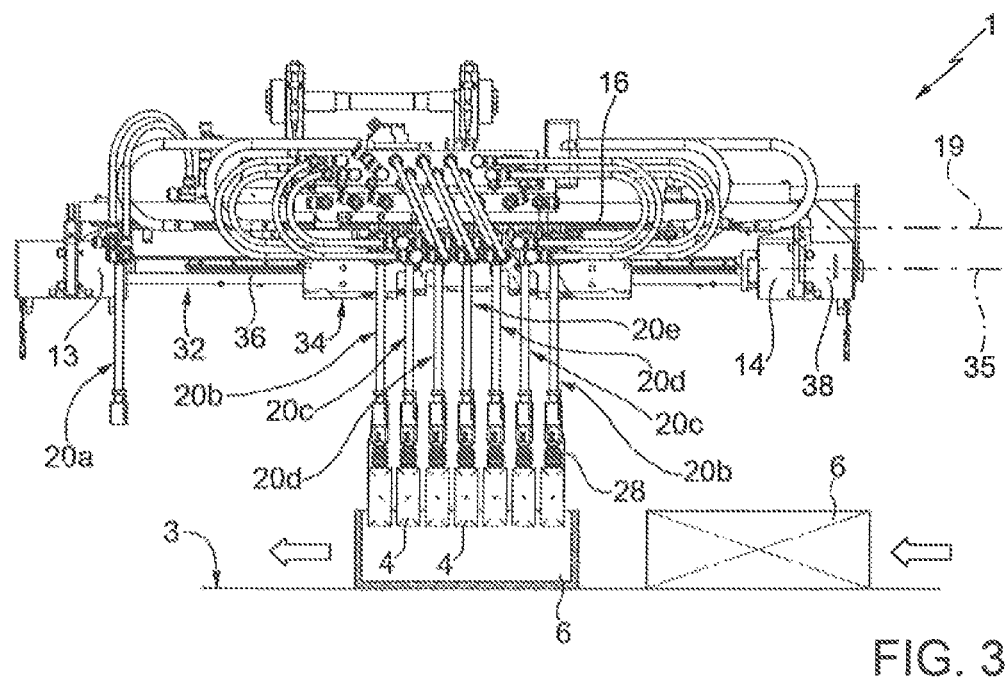

In particular, the products 4 to be transferred are arranged, in the station 2, in a row along a horizontal direction 5, in fixed positions and at a predetermined constant distance from one another. The station 3, on the other hand, accommodates one or more containers 6, where the products 4 must be packaged. In particular, there is a row of containers 6, which is parallel to the direction 5 and moves, preferably at a constant speed, during the transfer motion carried out by the head 1 towards the station 3 (FIG. 2) and during the release of the products 4 into the containers 6 (FIG. 3); the robot preferably causes the head 1 to make a movement which is synchronized with the one of the containers 6 during the release of the products 4. In any case, this description can also be applied to cases in which the container 6 is still.

With reference to FIG. 1, again, the head 1 comprises a support structure 10, which is fixed at the end of an arm of the aforementioned robot, in a way which is not shown and described in detail herein. In particular, the structure 10 comprises: an upper plate 11, which is horizontally elongated; and two sides 13, 14, which are arranged in fixed positions at the opposite ends of the plate 11 and project downwards from the plate 11.

The plate 11 supports, in fixed positions, one or more pneumatic distributors 15 and a guide 16, which extends along a straight horizontal direction 19 and is preferably arranged on a lower face 17 of the plate 11.

The head 1 further comprises a plurality of pick-up members arranged in a row, side by aide, along the direction 19. In this specific case, the pick-up members are also called "fingers". For example, there are eight pick-up members, indicated by 20a, 20b, 20c, 20d, 20e, 20d, 20c and 20b, respectively, following a position order from the left to the right in FIGS. 1, 2 and 3. The pick-up member 20a advantageously is an auxiliary pick-up member, which means that it is used together with the other ones only for some types and/or formats of products. Indeed, according to FIGS. 2 and 3, in this specific case, the sole pick-up members 20b, 20c, 20d and 20e are used to transfer the products 4, whereas the pick-up member 20a remains inactive. The pick-up member 20a can become active when a so-called "format change" is performed, namely when the head 1 is reconfigured in order to package different products (for example, when the device shown in FIG. 8 is used).

Figure 4:
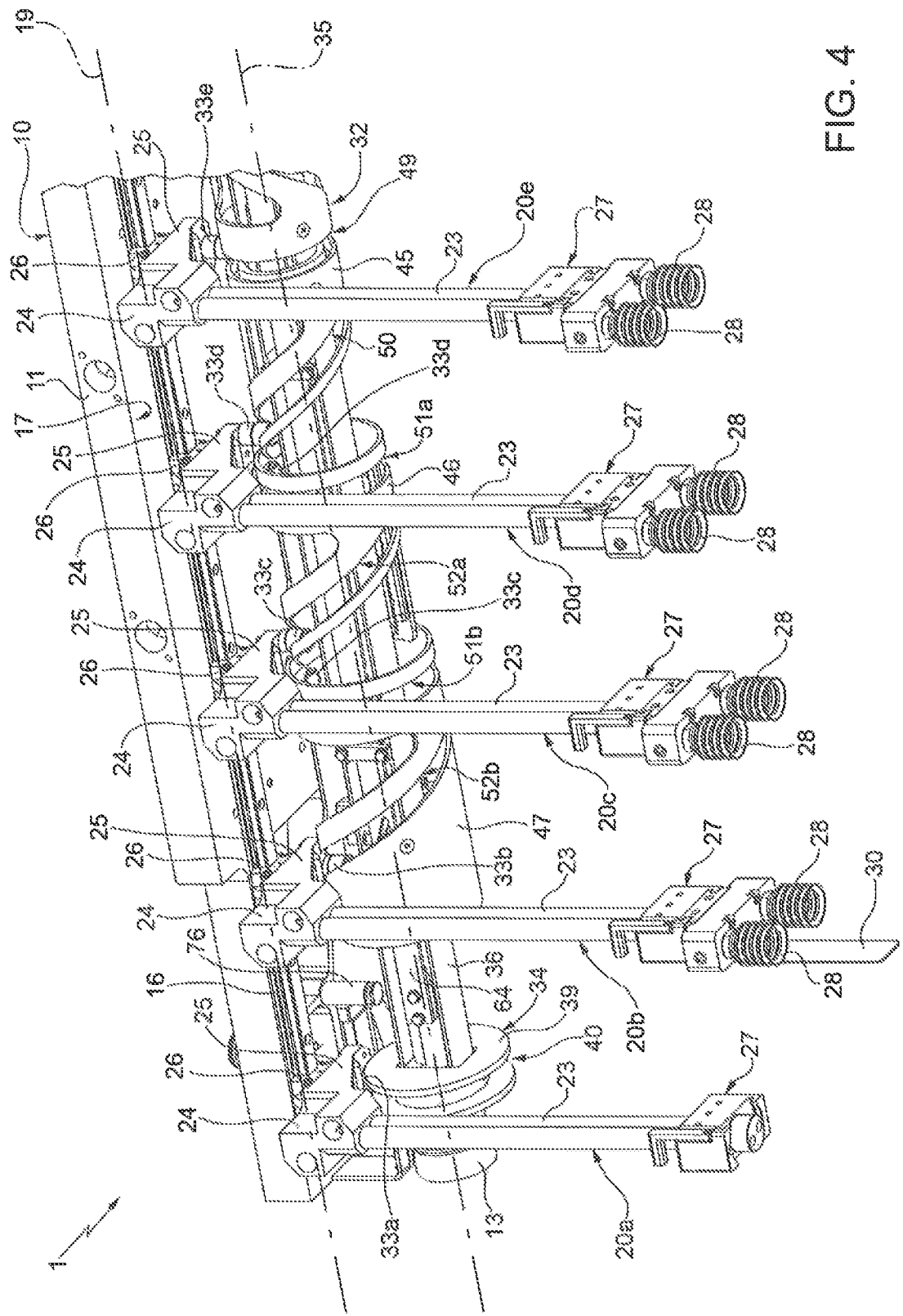
FIG. 4 is a perspective view from the bottom showing, on a larger scale, a detail of the pick-up head in FIG. 1.

The pick-up members 20a-20e comprise respective vertical stems 23 and respective support blocks 24, fixed at the upper ends of the stems 23. With reference to FIG. 4, the blocks 24 preferably comprise respective end portions 25, which project horizontally and orthogonally to the direction 19 and are arranged vertically under the face 17. The blocks 24 carry, in fixed positions, respective sliders or slides 26, which are coupled to the guide 16 in a sliding manner, so that the pick-up members 20a-20e can translate along the direction 19. In particular, the sliders 26 are fixed on the portions 25.

The pick-up members 20a-20e further comprise respective devices 27, which are arranged in fixed positions at the lower ends of the stems 23 and can be operated, for example in a pneumatic manner, so as to grip, hold and release the relative products 4. In this specific case, with the exception of the pick-up member 20a, the devices 27 comprises respective pairs of suction cups 28, which are designed to come into contact with the upper face of the products 4. Alternatively, the devices 27 can comprise either a different sucking system or electrically or pneumatically operated clamps.

According to FIG. 1, the devices 27 are connected to the distributors 15, in particular through passages on the inside of the stems 23 and through hoses 29 connecting the blocks 24 to connectors available on the distributors 15. The distributors 15, in turn, are connected to a pneumatic system (not shown) for the generation of a vacuum, so as to cause the area under the suction cups 29 to be subjected to a depression when the products 4 must be gripped. The release of the products 4 in the station 3 (FIG. 3) takes place by controlling respective solenoid valves of the distributors 15 so as to stop the depression or so as to generate a light pneumatic pressure between the suction cups 26 and the upper face of the products 4.

In the specific and particular example shown herein, the devices 27 of the two pick-up members 20b carry respective side plates 30, which are fixed relative to the corresponding stems 23 and project downwards relative to the suction cups 28 so as to define respective support abutments, which are orthogonal to the direction 19.

The pick-up members 20b, 20c and 20d are translated along the guide 16 by a moving assembly 32 between a wide or open position (FIG. 1) and a compact or close configuration (FIGS. 2 and 3), in which the pick-up members 20a-20e are closer to one another along the direction 19. In particular, in the wide configuration, the suction cups 28 are arranged at a distance that is the same as the one present between the products 4 to be picked up in the station 2, whereas, in the compact configuration, the suction cups 28 are arranged at a distance that is the same as the one requested by the spaces present in the container 6 in the station 3.

In the wide configuration, the distances between the stems 23 (also in the pick-up member 20a) preferably are all the same.

The assembly 32 is a cam-and-tappet assembly and comprises at least one tappet element on each pick-up member. According to a preferred aspect of the invention, which is shown in FIG. 4, each one of the pick-up members 20a, 20b and 20e is provided with one single tappet element, indicated with 33a, 33b and 33e, respectively. On the other hand, each one of the pick-up members 20c and 20d is provided with a pair of tappet elements, indicated with 33c and 33d, respectively.

The tappet elements 33a, 33b, 33c, 33d, 33e are carried by the blocks 24 in a projecting manner and are preferably defined by rollers which are capable of rolling in an idle manner around respective axes. In particular, the tappet elements project downwards from the portions 25 of the blocks 24, so that their rotation axes are vertical.

With reference to FIGS. 1 and 4, the assembly 32 further comprises a rotating cam device 34, which extends between the sides 13 and 14 along an axis 35, which is parallel to the direction 19, under the plate 11 and behind the stems 23. The cam device 34 comprises a support member preferably defined by a shaft 36, which can rotate around the axis 35 due to the action of an actuator 38, which is preferably defined by a rotary electric motor or a rotary actuator carried by the side 14 in a position coaxial Co the shaft 36 along the axis 35.

The opposite axial ends of the shaft 36 are coupled to the sides 13 and 14 so as to be able to rotate around the axis 35 and so as to remove the cam device 34 and make it interchangeable relative to the structure 10. The ways in which the shaft 36 can be coupled to the sides 13, 14 are known and are not described in detail; for example, it is possible to use the solution disclosed in EP2192062.

In the particular example shown herein, the cam device 34 comprises a disc 39, which is arranged at the pick-up member 20a, is axially fixed relative to the shaft 36 and has an outer circular grooves 40 engaged by the tappet element 33a. The coupling between the tappet element 33a and the grooves 40 keeps the pick-up member 20a in a fixed position along the direction 19 during the rotation of the shaft 36. Indeed, as already mentioned above, in the example configuration shown herein, the pick-up member 20a is inactive, namely it is not used; it can be used when the head 1 needs to operate with another product format (for example, with the device of FIG. 8).

Figure 6:
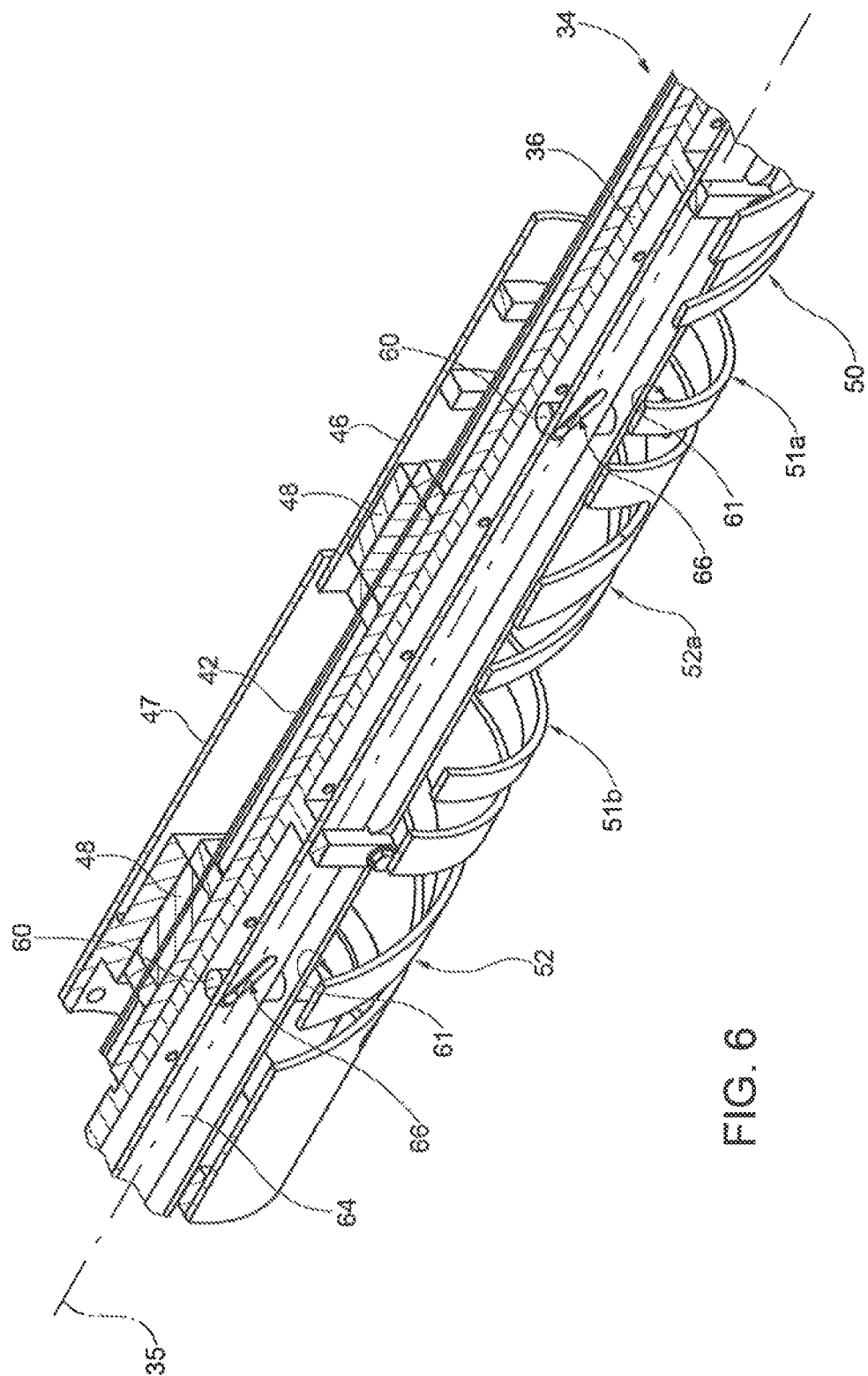
FIGS. 6 and 7 are perspectives showing two details of the device of the invention, on a larger scale and in a cross-sectional view according to respective horizontal section planes.

With reference to FIG. 6, the cam device 34 comprises a guide 42, which is parallel to the axis 35 and fixed relative to the shaft 36 so as to only rotate around the latter; and a plurality of tubular sectors or sleeves, which are coaxial and arranged around the shaft 36, are supported by the latter so that they can rotate together around the axis 35, but have diameters that are different from one another, so that they can be inserted into one another without interference.

In particular, there are a sector 45 in a central position, two sectors 46 that are symmetric to one another relative to a vertical plane going through the centre of the sector 45, and two sectors 47 axially arranged more on the outside and symmetric to one another relative to said vertical plane. The sector 45 is axially fixed relative to the shaft 36 and has an outer diameter which is smaller than the inner diameter of the sectors 46. The outer diameter of the sectors 46, in turn, is smaller than the inner diameter of the sectors 47.

The sectors 46 and 47 are coupled to the guide 42 by means of respective sliders or slides 48 so as to be supported by the shaft 36 and be capable of axially sliding relative to the sector 45. The sector 45 preferably has a cam 49, which extends in a circumferential direction, namely develops along a circle of an arc (which means that it lies on a plane orthogonal to the axis 35), and is engaged by the tappet element 33e (FIG. 4). Therefore, in the example shown herein, given the shape of the cam 49 and given the fixed axial position of the sector 45, the pick-up member 20e remains axially fixed during the rotation of the shaft 36. The sector 45 further has two cams 50, which are symmetric to one another relative to the cam 49 (namely, relative to the aforesaid vertical plane), at least partly develop in a helical or spiral shape (namely, are inclined at an angle ranging from 0° to 90° relative to the direction tangential to the axis 35) and are engaged by respective tappet elements 32d of the pick-up members 20d. Given the shape of the cams 50, the pick-up members 20d translate along the direction 19 from and to the pick-up member 20e, which is arranged at the centre, during the rotation of the shaft 36.

The description below will only discuss half of the pick-up members 20b, 20c, 20d and of the sectors 46, 47, since the other half is symmetrical.

The sector 46 has a pair of cams 51a and 52a and the sector 47 has a pair of cams 51b and 52b: the cams 51a and 51b have a circumferential development similar to the one of the cam 49, whereas the cams 52a and 52b at least partly have a spiral shape, like the cam 50.

According to FIG. 4, taking into account the two tappet elements 33d of the pick-up member 20d, the first one engages the cam 50 of the sector 45, as already mentioned above, whereas the second one engages the cam 51a of the sector 46. Therefore, the two tappet elements 33d keep the sector 46 constrained to the sector 45 and to the pick-up member 20d during the rotation of the shaft 36. In other words, the second tappet element 33d, by engaging the cam 51a, performs a moving or dragging function, so as to axially move the sector 46, together with the pick-up member 20d, relative to the sector 45 and to the pick-up member 20e, while the first tappet element 33d translates due to the action of the cam 50.

The operation is similar for the sector 47. Indeed, of the two tappet elements 33c of the pick-up member 20c, the first one engages the cam 52a of the sector 46, whereas the second one engages the cam 51b of the sector 47. In this way, during the rotation of the shaft 36, the cam 52a of the sector 46 causes the translation of the pick-up member 20c along the direction 19, from and to the pick-up member 20d, and, at the same time, the pick-up member 20c drags the sector 47 thanks to the second tappet element 33c, which engages the cam 51b. This movement takes place while the sector 46, in turn, is dragged by the tappet element 33d while the sector 45 rotates.

Finally, the tappet element 33b of the pick-up member 20b engages the cams 52b of the sector 47. Given the shape of the cam 52b, the pick-up member 20b translates along the direction 19 from and to the pick-up member 20c and towards the sector 46 during the rotation of the shaft 36.

According to variants which are not shown herein, the sector 45 is not provided with the cam 49; and/or it only has one of the two cams 50; and or it is arranged in a different position from the one of the example shown herein; and/or it is axially movable along the shaft 36. Furthermore, the cam device 34 could comprise a number of axially movable sectors which is different from the one indicated, by mere way of example, for the sectors 46 and 47 and/or a larger number of axially fixed sectors.

As already mentioned above, the sectors 46 and 47 translate with no need to provide additional actuators, since they are dragged by the tappet elements 33d and 33c. According to variants which are not shown herein, the axially movable sectors are caused to translate by means of one or more actuators. In this way, the sectors 46 and 47 can be controlled independently of one another and each one of the pick-up members 20c and 20d can be provided with one single tappet element, instead of having two of them.

Figure 5:
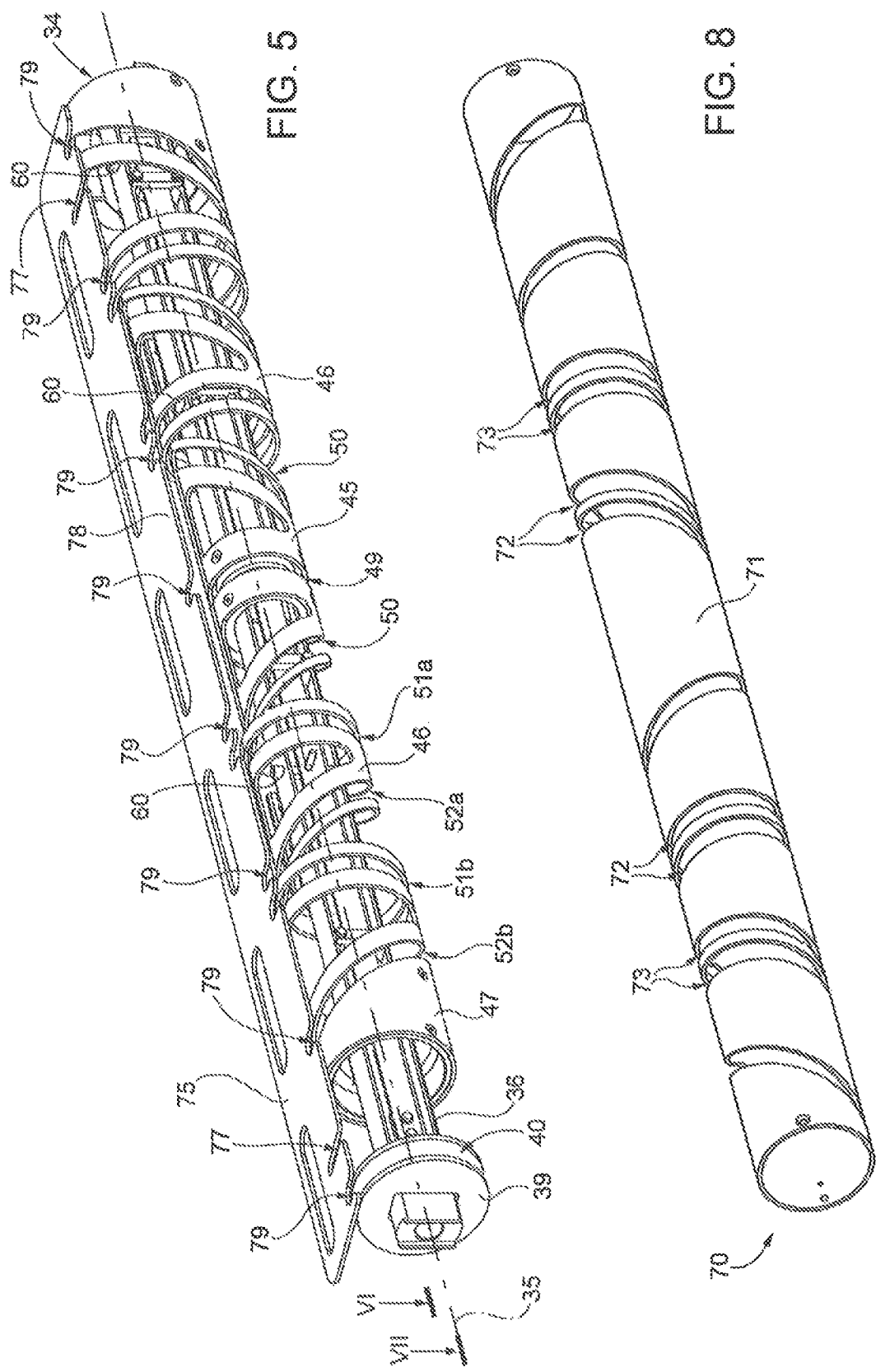
FIG. 5 is a perspective of the device according to the invention, shown together with a plate component, which can be used during the replacement of the device from the pick-up head.

According to FIGS. 5 and 6, the sectors 45, 46 and 47 preferably are lightened or empty in the parts that are not affected by the cams and by the sliders 48, so as to reduce the rotation inertia thereof. The cams 49, 50, 51a, 52a, 51b, 52b are advantageously defined by slits, which are go through the sectors 45, 46 and 47 in a radial direction. According to alternatives which are not shown herein, the cams are defined by channels, grooves and/or projections on the outer side surface of the sectors 45, 46 and/or 47.

The cams preferably extend around the axis 35 over an angle that is smaller than 360°, for example an angle ranging from 180° to 260°.

The actuator 38 is controlled so as to cause the shaft 36 to rotate in an opposite rotation direction when the axial movement of the pick-up members 20a-20e between the compact and wide configurations needs to be reversed. In particular, the supply of power and/or the controls reach the actuator 38 from a control unit 55, which is schematically shown in FIG. 1. Furthermore, the unit 55 controls the solenoid valves of the distributors 15 in a synchronized manner. In order to synchronize the operation of the devices 27, the movements of the robots and the rotation of the cams around the axis 35, the shaft 36 or the actuator 38 can be provided with an angular positioning sensor, which Bends signals indicating the angle of rotation to the unit 55.

Figure 7:
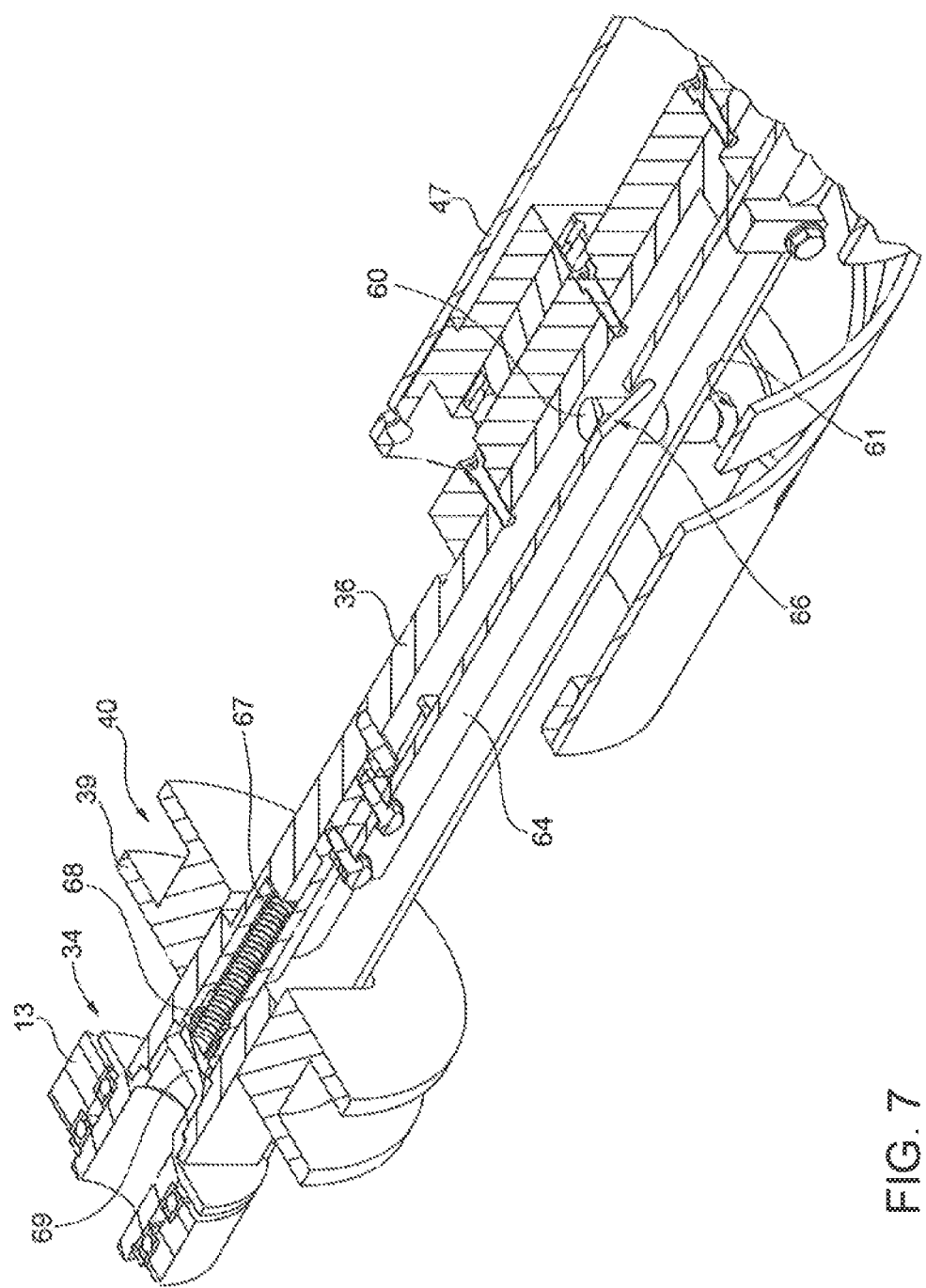

With reference to FIGS. 6 and 7, the cam device 34 comprises a releasable retention system to constrain the sectors 46 and 47 in a fixed axial position relative to the shaft 36 when the cam device 34 is uncoupled from the structure 10 and, hence, the sectors 46 and 47 disengage the tappet elements 33d, 33c and 33b.

This retention system comprises, for each sector 46 and 47, a relative blocking element 60, which is coupled to the shaft 36 so as to move between a retention position and a release position. In the retention position, the blocking elements 60 engage respective seats 61 made in the sectors 46 and 47 so as to axially hold them relative to the shaft 36, preferably when the pick-up members 20a-20e are arranged in the wide position.

In the release position, the blocking elements 60 are retracted so as to disengage the seats 61 and allow the sectors 46, 47 to translate.

The blocking element 60 can preferably slide radially in respective seats of the shaft 36. There preferably is one single slider 64 to move the blocking elements 60 all together. The slider 64 is coupled to the shaft 36 so as to slide parallel to the axis 35 and, in particular, is arranged in a diametrically opposite position relative to the guide 42. Hence, the translation direction of the slider 64 is orthogonal to the one of the blocking elements 60. In order to transfer the motion from the slider 64 to the blocking elements 60, the latter are coupled to the slider 64 by means of respective transmissions 66, for example of the type having an inclined plane or of the cam-and-tappet type. At least one preloaded spring 67 exerts a thrust to move the blocking elements 60 to the retention position. One of the two ends of the shaft 36 houses a release element 68, which is movable relative to the shaft 36 and automatically moves from a forward position (not shown) towards a backward position (FIG. 7) against the thrust of the spring 67 when the shaft 36 is coupled to the structure 10, due the effect of a suitable abutment 69 available on the structure 10. The release element 68 is fixed relative to the slider 64 so that it causes the translation of all the blocking elements 60 to the release position during the coupling to the structure 10. On the contrary, when the cam device 34 is uninstalled from the structure 10, the release element 68 automatically returns to its forward position due to the thrust of the spring 67, as there is no abutment 69 any longer, so that the blocking elements 60 automatically move to the retention position.

The cam device 34 is interchangeable and can be replaced by a different rotating cam device, for example of the type shown in FIG. 8 and indicated by number 70. The device 70 comprises a cylinder 71 having, on its outer surface, a plurality of cams, which, therefore, are axially fixed relative to one another. These cams are engaged by the tappet elements 33*a*, 33*b*, 33*c*, 33*d* and are shaped so as to move two groups, each consisting of four pick-up members (one group consisting of pick-up members 20*a*, 20*b*, 20*c* and 20*d* and the other group consisting of pick-up members 20*e*, 20*d*, 20*c* and 20*b*), closer to/away from one another, in a way which is not shown herein. In particular, the two tappet elements 33*d* of each pick-up member 20*d* engage respective cams 72, which are parallel to one another. Similarly, the two tappet elements 33*c* of each pick-up member 20*c* engage respective cams 73, which are parallel to one another.

In this configuration, the pick-up member 20*a* is also used to move the products.

FIG. 5 also shows a plate element 75, which is separate from the cam device 34 and fulfils the function of axially locking the pick-up members 20*a*-20*e* of the head 1 along the guide 16 when the can device 34 or 70 is uninstalled from the structure 10.

During use, the plate element 75 is coupled to supports 76 (FIG. 4), which are part of the structure 10 and, in particular, project downwards from the plate 11. For example, the plate element 75 has a pair of seats 77, which are engaged by two supports 76. The plate element 75 substantially has a comb-like shape, namely it comprises a front edge 79 having a series of retention recesses 79, which are arranged in the area of the positions of the tappet elements 33*a*-33*e* (for example, when the pick-up members 20*a*-20*e* are arranged in the wide position). During use, the recesses 79 are engaged by the tappet elements 33*a*-33*e* so as to hold he pick-up members 20*a*-20*e* still.

Once the cam device 34 or 70 is installed in the head 1, the plate element 75 is removed from the supports 76 so as to free the pick-up members 20*a*-20*e*.

Owing to the above, it is evident that, thanks to the spiral profile of the cams 50, 52*a* and 52*b*, their rotation around the axis 35 causes an axial translation of the tappet elements 33*d*, 33*c* and 33*b* and, hence, a sliding of the pick-up members 20*d*, 20*c* and 20*b* along the guide 16 between the compact and wide configurations, with motion profiles (speed, accelerations, etc.) which are set during the design phase. At the same time, according to the invention, the cams 52*a* and 52*b* are axially movable from and to the cam 50, so that there is an additional translation component to be added to the one produced by the sole cam 52*a* and 52*b*.

Therefore, it is evident that the axial movement of the cams 52*a* and 52*b* leads to greater ranges/distances/speeds of the pick-up members 20*b*-20*e* between the compact and wide configuration, compared to known solutions where the cams are all fixed along the axis 35.

In particular, the difference between the diameters of the sectors 45, 46, 47 helps increase the free relative sliding and, therefore, is suitable for the compactness of the device.

Furthermore, the space taken up by the cam device 34 is relatively small.

At the same time, the blocking elements 60 make it easier for the cam device 34 to be installed on, and uninstalled from, the pick-up head 1, since they hold the sectors 46 and 47 still relative to the shaft 36 and, hence, facilitate these operations. In other words, the locking of the sectors 46, 47 allows the cams to be easily coupled to the tappet elements 33*a*-33*e*, while the latter, in turn, are held still by the plate element 75 during the so-called "format change".

Finally, owing to the above, the cam device 34 and the head 1 described with reference to the preferred example shown in the accompanying drawings can be subjected to changes and variations, which do not go beyond the scope of protection of the invention, as set forth in the appended claims.

As far as the device 34 is concerned, the cams could have a different shape from the one shown herein; and/or the structure 10 could have a different shape, and/or the sectors 46 and 47 could be available in a different number from the one indicated above and/or be dragged along the axis 35 during the rotation of the device 34 differently from what disclosed in the preferred embodiment described herein.

Finally, the sectors 45, 46, 47 could not be tubular and extend only over an arc of circumference.

The invention claimed is:

1. A rotating cam device for a pick-up head provided with pick-up members arranged side by side and at a variable distance; the device extending along a horizontal axis and comprising a first cam and at least a second cam, which extend around said horizontal axis, are suitable to be engaged by tappet elements carried respectively by a first and a second pick-up member, and have, at least partially, a sloped or spiral shape for causing a translation of said tappet elements parallel to said horizontal axis in response to a rotation of said first and second cams about said horizontal axis; wherein second cam is axially movable in respect to said first cam at least when said device is installed in said pick-up head.

2. The device according to claim 1, comprising a support member that extends along said horizontal axis and comprises two opposite ends suitable to be coupled to a support structure of said pick-up head, so as to rotate about said horizontal axis; said first cam being coupled to said support member in an angularly and axially fixed positions; said second cam being coupled to said support member in an axially movable manner and at an angularly fixed position.

3. The device according to claim 1, comprising a fourth cam which extends around said rotation axis, has at least partially a sloped or spiral shape and is movable along said horizontal axis in respect to said second cam.

4. A pickup head comprising:
a support structure;
a horizontal guide carried in a fixed position by said support structure;
a first and at least a second pick-up member, which are side by side, are coupled in a sliding manner to said horizontal guide, can be operated to grip and release respective products and are provided with respective tappet elements;
a moving assembly for translating said first and second pick-up members along said horizontal guide between a compact configuration and a wide configuration, wherein said first and second pick-up members are arranged at different distances; said moving assembly comprising:
  a) a cam device according to claim 1, coupled to said support structure; said first and second cams being engaged by said tappet element;
  b) at least one actuator controlled for moving said cam device in respect to said support structure.

5. The device according to claim 1, wherein said first and second cams are arranged on a first and on a second sector, coaxial to one another along said horizontal axis.

6. The device according to claim 5, wherein said first and second sectors have different distances from said horizontal axis so as to overlap one another.

7. The device according to claim 5, comprising moving means for axially moving said second sector in respect to said first sector.

8. The device according to claim 7, wherein said moving means comprise a third cam arranged on said second sector and suitable to be engaged by a further tappet element of said first pick-up member.

9. The device according to claim 8, wherein said third cam is defined by an arc of circle around said horizontal axis.

* * * * *